(12) United States Patent
Wu

(10) Patent No.: US 6,926,485 B1
(45) Date of Patent: Aug. 9, 2005

(54) NAIL HEADS OF A NAIL ROW

(76) Inventor: Chun Fu Wu, No. 3, Lane 111, Sec. 3, Minsheng Rd., Daya Shiang, Taichung (TW) 428

( * ) Notice: Subject to any disclaimer, the term of this patent is extended or adjusted under 35 U.S.C. 154(b) by 0 days.

(21) Appl. No.: 10/762,261

(22) Filed: Jan. 23, 2004

(51) Int. Cl.⁷ .......................... F16B 15/00; F16B 15/08
(52) U.S. Cl. .................................... 411/433
(58) Field of Search ................. 411/442–445, 481, 411/451.1, 488, 480, 483, 485, 489, 473, 411/475, 923, 451.5, 448, 433; 206/343–345

(56) References Cited

U.S. PATENT DOCUMENTS

| | | | | | |
|---|---|---|---|---|---|
| 161,280 | A | * | 3/1875 | Roger | 411/442 |
| 391,773 | A | * | 10/1888 | Bean | 411/489 |
| 1,699,421 | A | * | 1/1929 | Bean | 411/481 |
| 2,122,814 | A | * | 7/1938 | Hansen | 206/340 |
| 2,428,259 | A | * | 9/1947 | Anstett | 411/443 |
| 3,828,924 | A | * | 8/1974 | Perkins | 206/343 |
| 4,002,098 | A | * | 1/1977 | Colechia | 411/442 |
| 5,056,976 | A | * | 10/1991 | Sygnator et al. | 411/442 |
| 5,482,419 | A | * | 1/1996 | Leistner | 411/442 |
| 5,865,585 | A | * | 2/1999 | Sutt, Jr. | 411/442 |
| 6,000,893 | A | * | 12/1999 | Gabriel et al. | 411/442 |

* cited by examiner

*Primary Examiner*—Robert J. Sandy
*Assistant Examiner*—Jeffrey A. Sharp
(74) *Attorney, Agent, or Firm*—Troxell Law Office, PLLC

(57) ABSTRACT

The nail heads of a nail row respectively have two symmetrical oblique insert members respectively formed under the front and the rear side, and each oblique insert member has a horizontal plane and an inclined plane connected to each other. Between the horizontal plane and the flat striking portion of the nail head forms a preset thickness strong enough to resist striking. The inclined plane has its outer side edge connected with one side edge of the nail head to form a sharp nailing portion able to be smoothly nailed in a workpiece. The horizontal plane and the inclined plane are combined with the workpiece by mutual engagement, able to combine work pieces together with great stability and firmness.

4 Claims, 7 Drawing Sheets

NAIL HEADS OF A NAIL ROW

BACKGROUND OF THE INVENTION

1. Field of the Invention

This invention relates to a nail row, particularly to one whose nail heads are strong enough to endure striking and have great combination force after nailed in workpieces.

2. Description of the Prior Art

A conventional nail row 10, as shown in FIGS. 1 and 2, is composed of a plurality of T-shaped nails 11 connected together alongside. Each nail 11 is formed integral with a nail head 111 and a nail shank 112, and the nail head 111 has its topside formed with a striking portion 113 a little wider than the thickness of the nail shank 112 for the striking device (P) of a nailing gun to strike thereon and nail two workpieces together. Further, each nail shank 112 has the surface of its front and rear side respectively provided with a plurality of horizontal recessed lines 114 parallel to the lower plane of the nail head 111. Furthermore, when the nails 11 of the conventional nail row 10 are connected together alongside, the topsides of the nails 11 are respectively positioned at different heights so as to form an oblique nail row 10 with preset inclination, applicable to a nailing gun with an oblique nail cartridge.

A horizontal or an oblique nail row 10 has the nail shanks 112 of its nails 11 respectively nailed in workpieces to combine them together, and the horizontal recessed lines 114 of the nail shank 112 are able to increase frictional resistance between the nail shanks 112 and the workpieces so as to enhance their combination strength. However, the horizontal recessed lines 114 of the nail shank 112 are two short to produce enough frictional resistance, unable to obtain an excellent effect of combination. In addition, the nail head 111 of the nail 11 only serves as a striking portion and the plane under the nail head 111 can do nothing but rest on the workpiece 20, both of them unable to help strengthen the combination of the workpieces 20.

SUMMARY OF THE INVENTION

The objective of the invention is to offer the nail heads of a nail row, respectively formed with two symmetrical oblique insert members respectively composed of a horizontal plane and an inclined plane connected with each other so as to increase the striking enduring strength of the nail head and enable the nail to be nailed in a workpiece smoothly with the help of a sharp nailing portion of the nail head, able to nail and combine workpieces together comparatively firmly.

BRIEF DESCRIPTION OF DRAWINGS

This invention will be better understood by referring to the accompanying drawings, wherein.

DETAILED DESCRPTION OF THE PREFERRED EMBODIMENT

Figure 1:
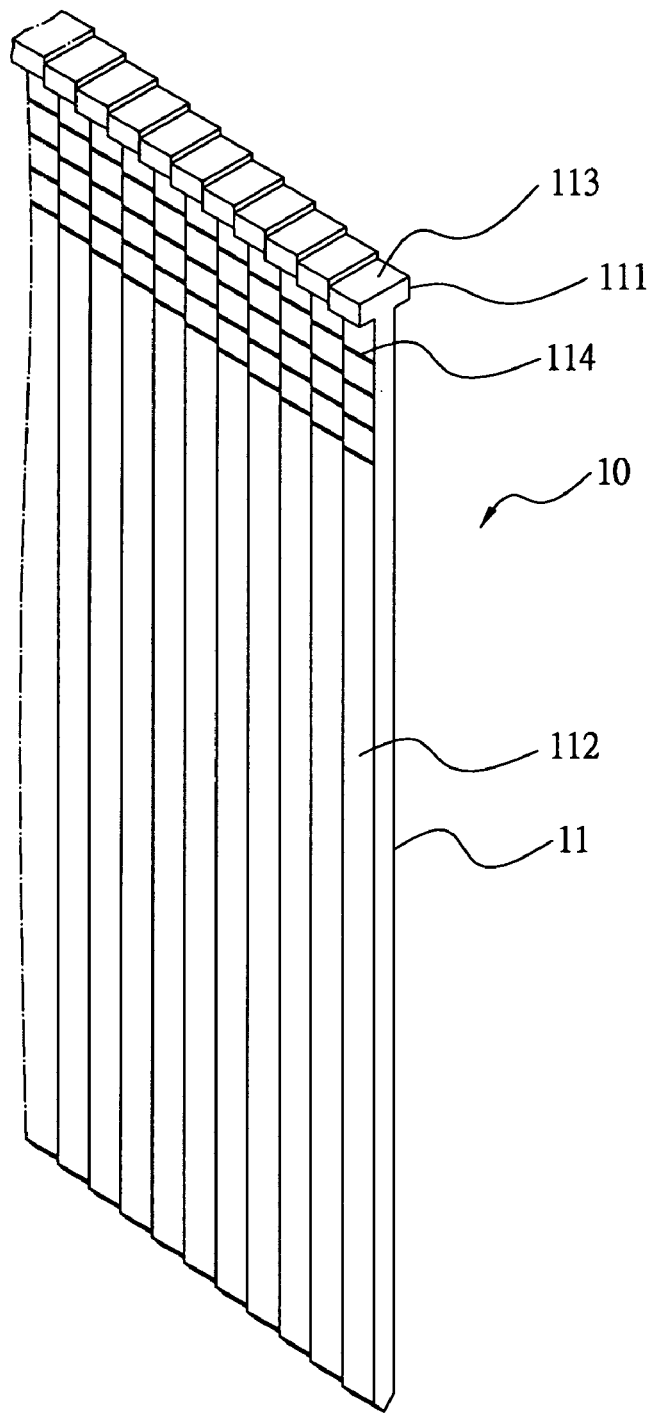
FIG. 1 is a perspective view of a conventional oblique nail row.
Figure 2:
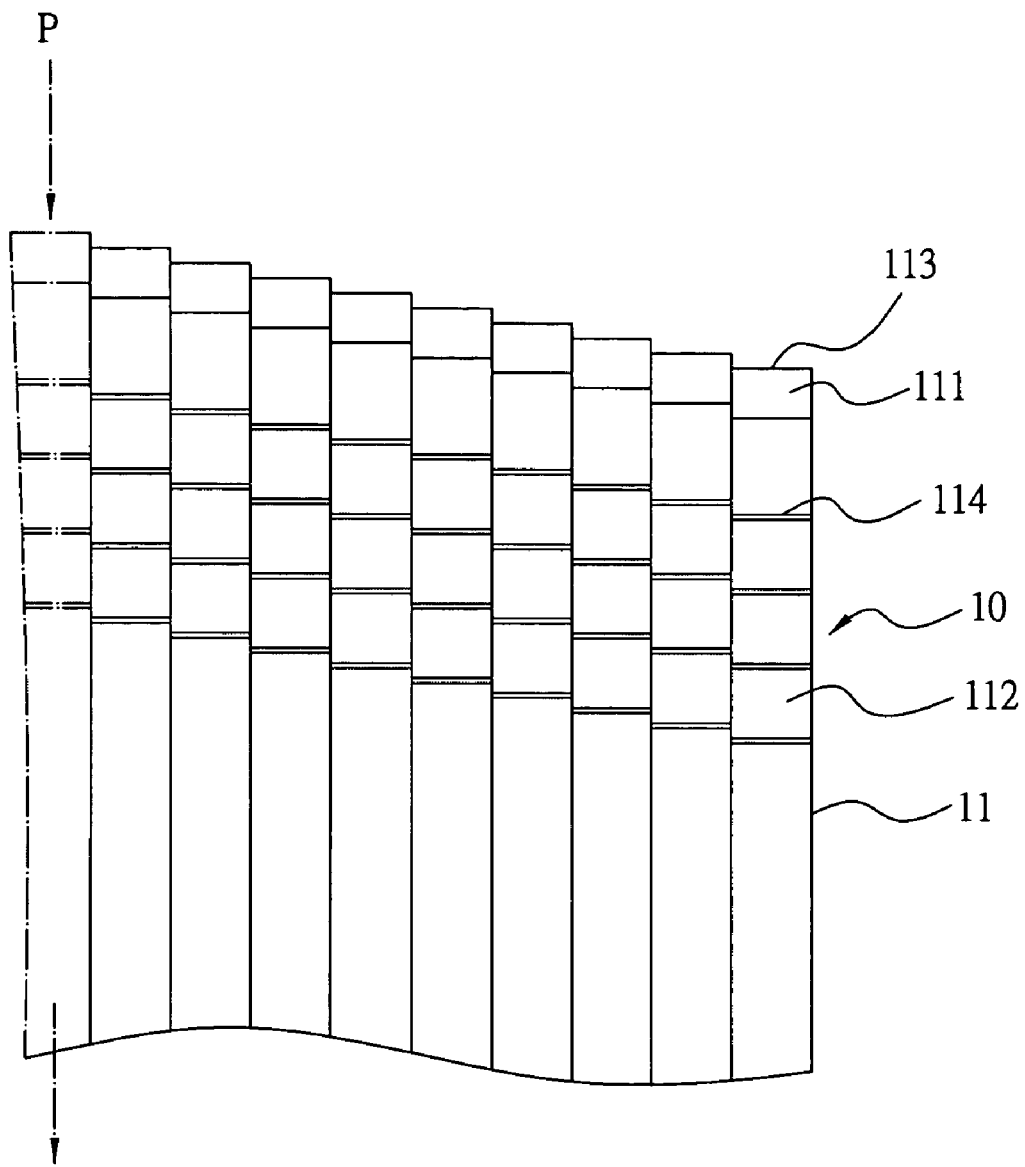
FIG. 2 is a frontal view of the conventional oblique nail row.
Figure 3:
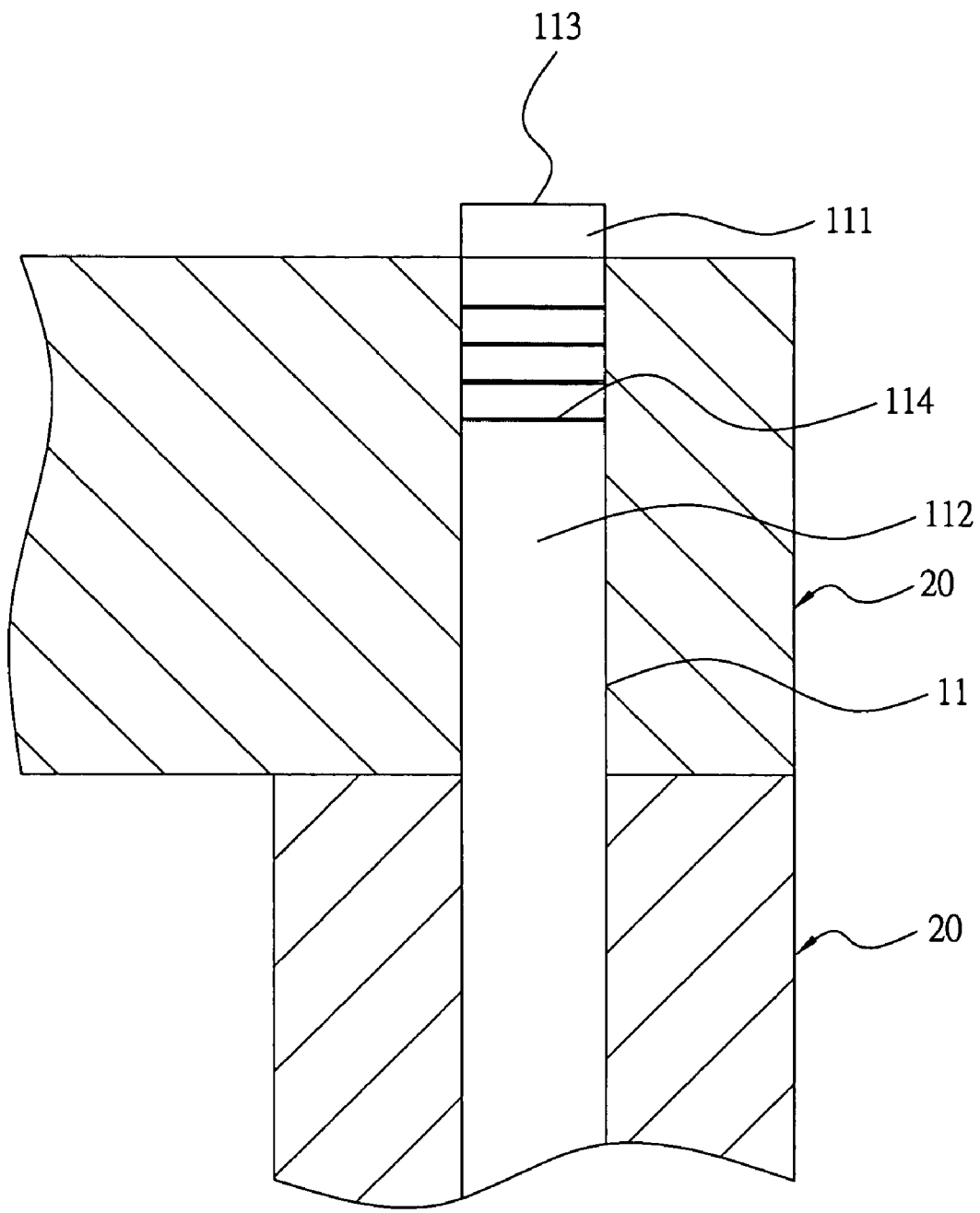
FIG. 3 is a cross-sectional view of the nail of the conventional nail row nailed in workpieces.
Figure 4:
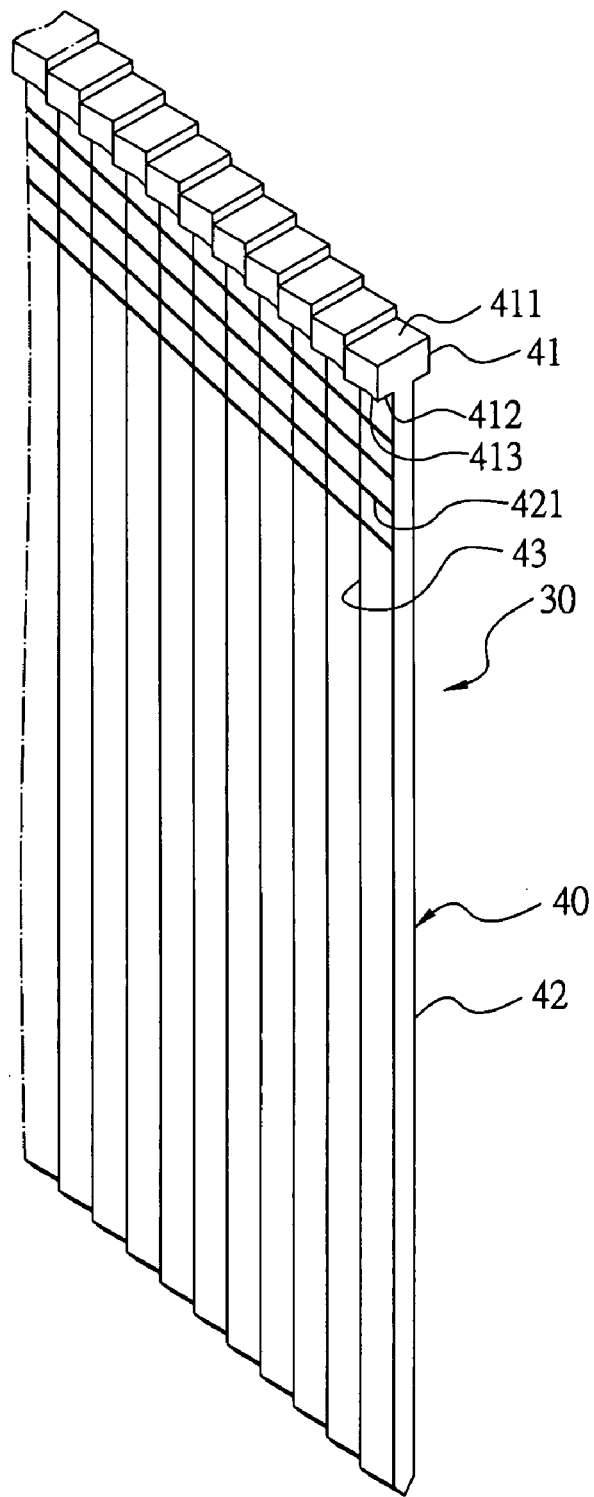
FIG. 4 is a perspective view of a nail row in the present invention.
Figure 5:
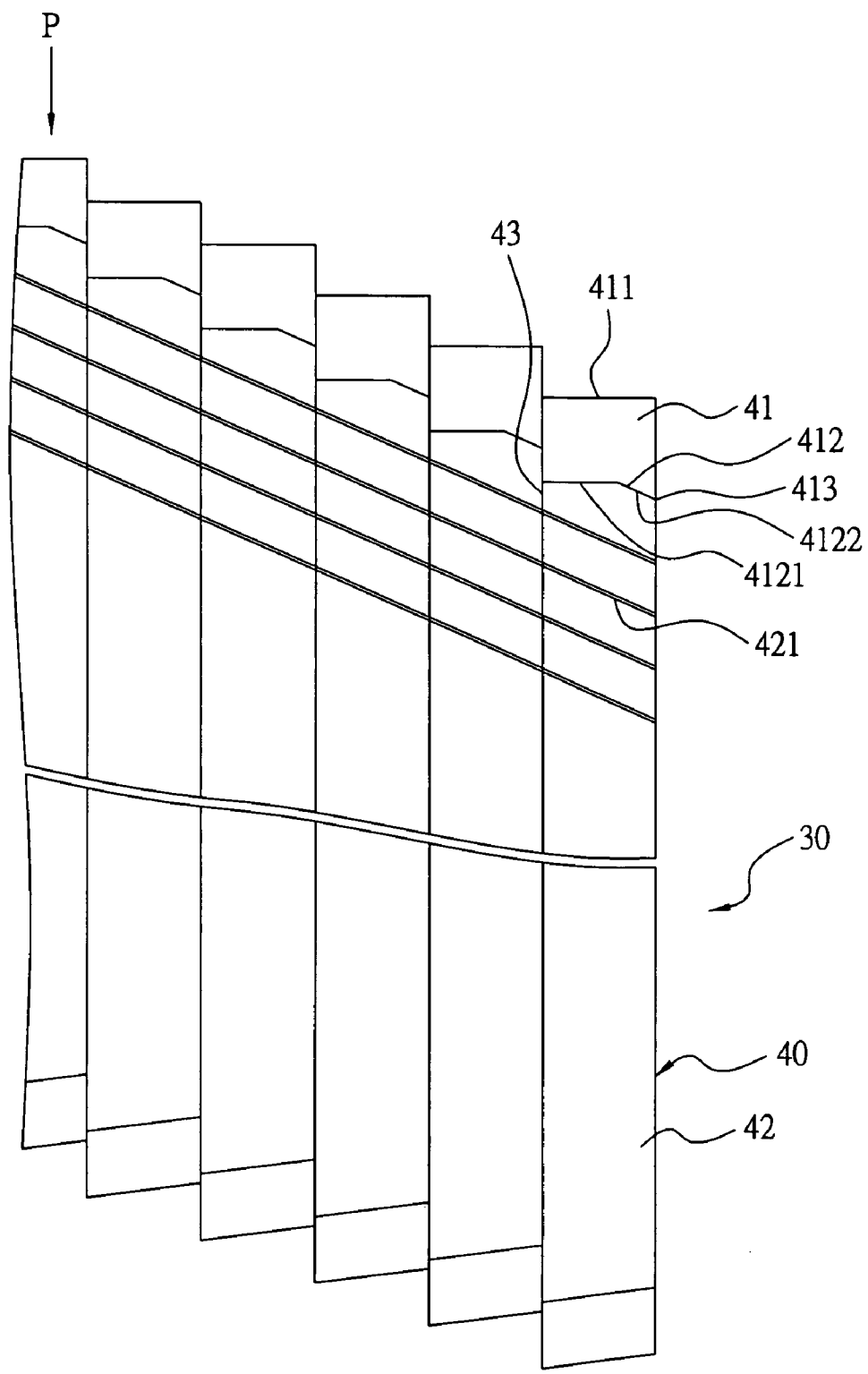
FIG. 5 is a front view of the nail row in the present invention.

A preferred embodiment of a nail row 30 in the present invention, a showing FIGS. 4 and 5, is composed of plurality of T-shaped nails 40 connected together alongside. Each nail 40 is formed with a nail head 41 and a nail shank 42, and the distance between the front and the rear side of the nail head 41 is larger than the thickness of the nail shank 42. The nail head 41 has its topside formed with a flat striking surface 411, which has its left and right side respectively extending straight downward to the lowermost end of the nail shank 42 and forming a connecting portion 43 for connecting the nails 40 together to make up the nail row 30 by coating with adhesives. When all the nails 40 of the nail row 30 are connected together alongside, their topsides are respectively positioned at different heights to form an oblique nail row 30 with a preset inclination.

The nail head 41 has two symmetrical oblique insert members 412 respectively formed under the protruding portion of its front and rear side. Each oblique insert member 412 is composed of a horizontal plane 4121 and an inclined plane 4122 connected with each other in a ratio of 2:1 in length. The horizontal plane 4121 is parallel to the flat striking portion 411 of the nail head 41, while the inclined plane 4122 forms an acute angle to the vertical side of the nail head 41 to make up a sharp nailing portion 413. In addition, the nail shank 42 has the surface of its front and rear side respectively provided with a plurality of oblique recessed lines 421 spaced apart equidistantly from an upper side to a lower side and parallel to the inclined plane 4122 of the oblique insert member 412 of the nail head 41.

Figure 6:
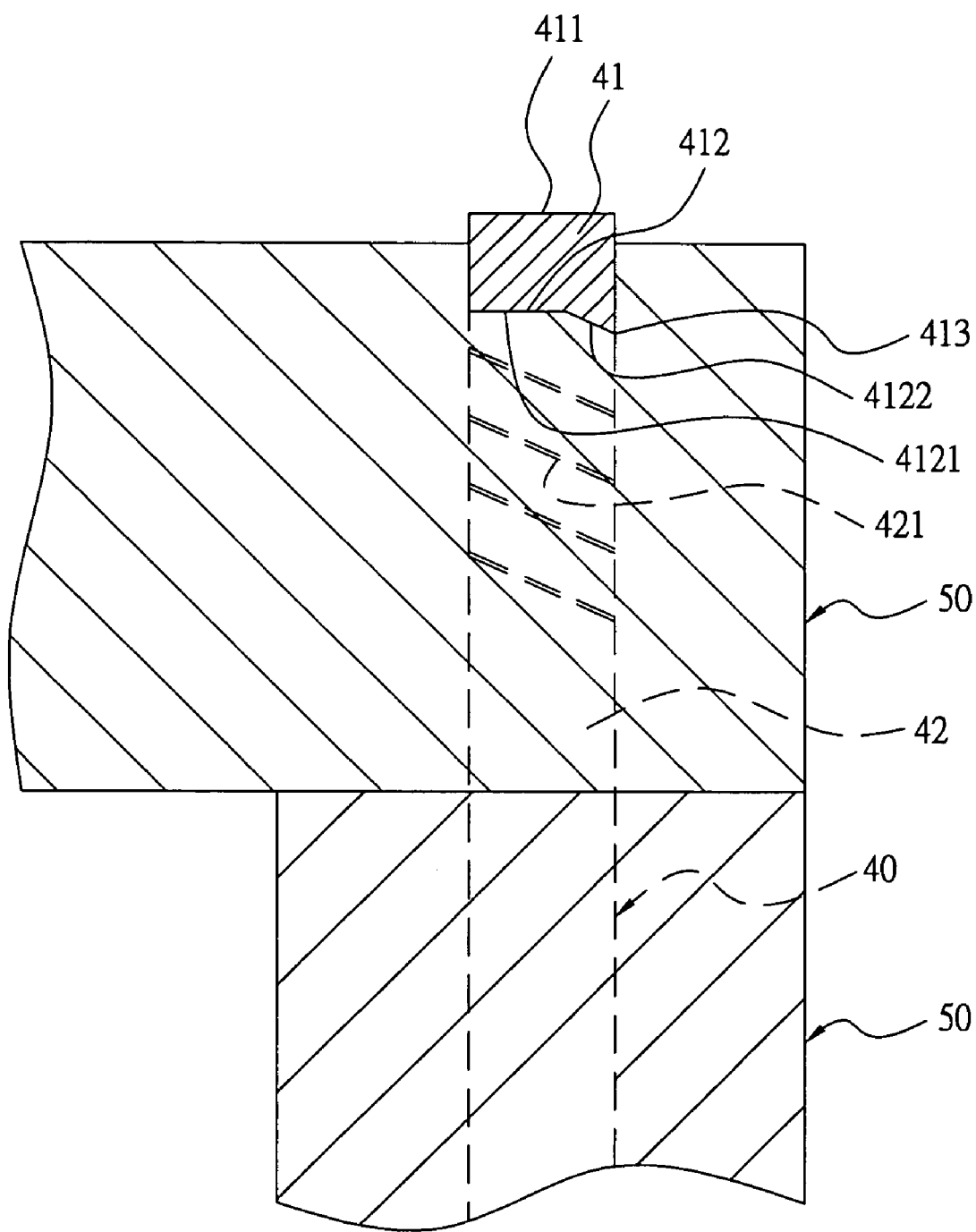
FIG. 6 is a cross-sectional view of the nail of the nail row nailed in workpieces in the present invention.

In using, a shown in FIGS. 5 and 6, the oblique nail row 30 is fitted in the oblique nail cartridge of a nailing gun and then the nails 40 of the nail row 30 are orderly and respectively struck out and nailed in workpieces 50 by a nail striking device (P) of the nailing gun. Being a plane, the nail striking surface 411 of the nail head 41 can contact with the nail striking device (P) at a right angle to enable the nail 40 to be impartially nailed into the workpieces 50. In addition, the comparatively long horizontal plane 4121 of the oblique insert member 412 and the nail striking surface 411 of the nail head 41 are formed therebetween with a preset thickness which is strong enough to resist the striking force of the nail striking device (P), preventing the nail head 41 from deformed excessively or broken and enabling the nail 40 to be nailed into the workpieces 50 smoothly. Additionally, when the nail head 41 is struck by the nail striking device (P), the sharp nailing portion 413 of the oblique insert member 412 of the nail head 41 can be deeply stuck in the workpiece 50, and the entire oblique insert member 412 and even the whole nail head 42 can also be firmly stuck into the workpiece 50. Thus, the horizontal plane 4121 and the inclined plane 4122 of the oblique insert member 412 are combined with the workpiece 50 by mutual engagement of different levels, able to let the nail 40 and the workpiece 50 combine together with great stability and firmness.

Further, the oblique recessed marks 421 of the nail shank 42 of this invention are respectively longer than the horizontal recessed lines 114 of the conventional nail shank 112, as shown in FIG. 6. Therefore, after the nail 40 is nailed into the workpiece 50, the frictional resistance between them will be enhanced to increase their combination strength.

Figure 7:
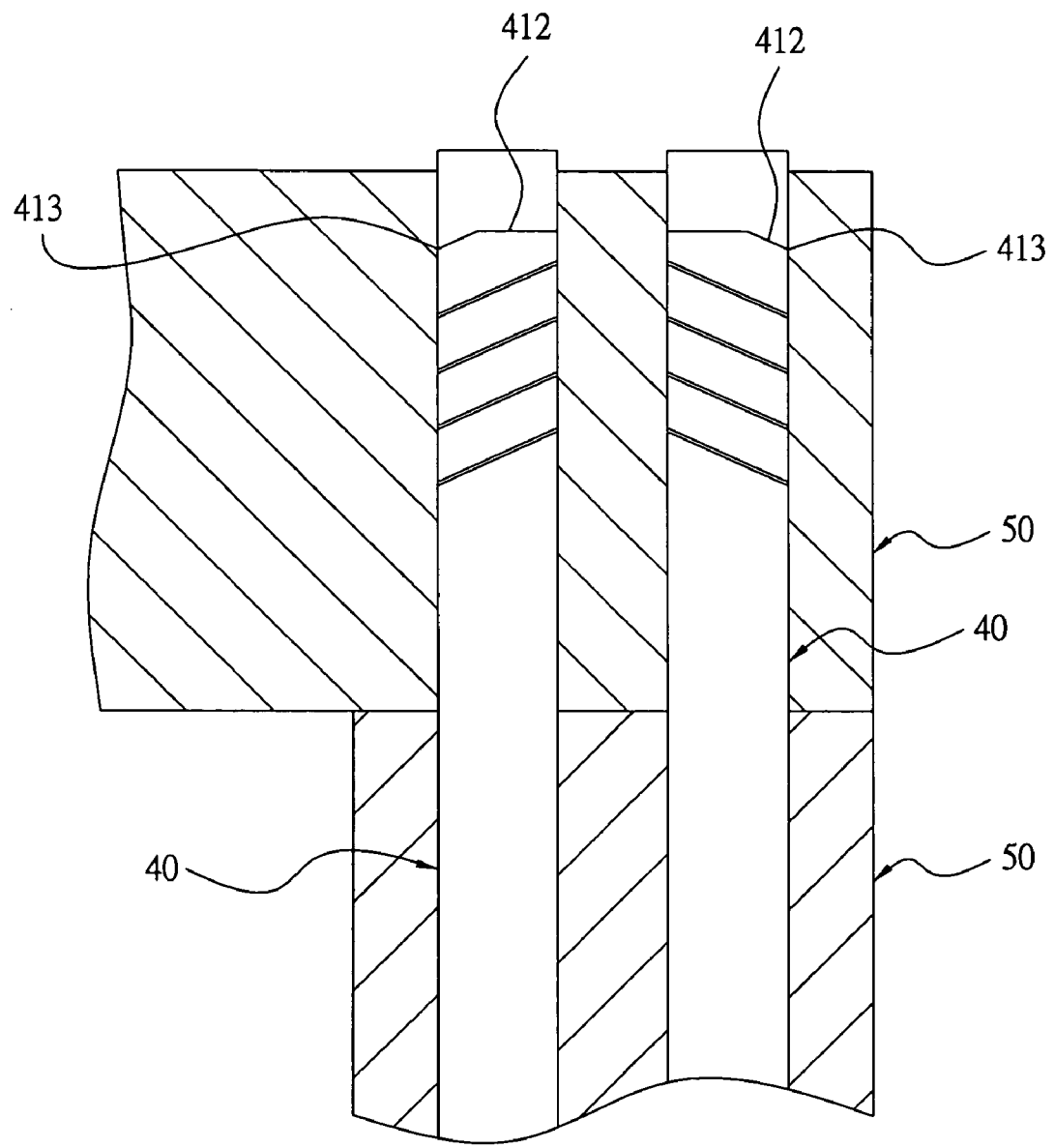
FIG. 7 is a cross-sectional view of two nails of the nail row reversely nailed in workpieces in the present invention.

Furthermore, as shown in FIG. 7, in case work pieces 50 need to be nailed together with plural nails 40 of this invention, every two nails 40 can be positioned reversely in the direction and nailed in the workpieces 50, that is, the sharp nailing portions 413 of the oblique insert members 412 of every two nails 40 are positioned reversely and symmetrically to be orderly nailed in the workpieces 50, thus able to enhance the combination strength of the workpieces 50.

As can be understood from the above description, this invention has the following advantages.

1. The nail head 41 of the nail 40 has its front and rear side respectively formed with an oblique insert member 412 and a sharp nailing portion 413, and the nail shank 42 of the nail 40 has the surface of its front and rear respectively provided with a plurality of oblique recessed lines 421, increasing the combination strength of the nail 40 with the workpieces 50.

2. The oblique nail row 30 of this invention is applicable to a nailing gun with an oblique nail cartridge, enabling the nailing gun to carry out nailing work at any position of workpieces and facilitating operation of the nailing gun.

While the preferred embodiment of the invention has been described above, it will be recognized and understood that various modifications may be made therein and the appended claims are intended to cover all such modifications that may fall within the spirit and scope of the invention.

I claim:

1. A nail row comprising:
  a plurality of T-shaped nails, each of the plurality of T-shaped nails having:
  a) a nail shank;
  b) a nail head connected to the nail shank and having a thickness from a front to a back that is larger than a thickness from a front to a back of the nail shank, the nail head having a flat striking surface located on a top thereof, the nail head and the nail shank have co-planar left and right sides;
  c) two connecting portions, each of the two connecting portions being located on one of the co-planar left and right sides and coated with an adhesive and adjoined to one of the two connecting portions of an adjacent one of the plurality of T-shaped nails; and
  d) two symmetrical oblique insert members, each of the two symmetrical oblique insert members are formed on a bottom of a protruding portion of the nail head and having:
    i) a horizontal plane spaced apart from and positioned parallel to the flat striking surface; and
    ii) an inclined plane connected to the horizontal plane and having a nailing portion formed by an acute angle formed between the inclined plane and one of the left and right sides of the nail head.

2. The nail row according to claim 1, wherein each horizontal plane has a length that is twice a length of each inclined plane.

3. The nail row according to claim 1, wherein the shank of each of the plurality of T-shaped nails has a plurality of oblique recessed lines spaced apart an equal distance and located on the front and back thereof.

4. The nail row according to claim 3, wherein the top of the nail head of one of the plurality of T-shaped nails is located at a height different from a height of the top of the nail head of the adjacent one of the plurality of T-shaped nails, and each of the plurality of oblique recessed lines on one of the plurality of T-shaped nails have an end aligning with an end of each of the plurality of oblique recessed lines of the adjacent one of the plurality of T-shaped nails.

* * * * *